United States Patent [19]

Gervais et al.

[11] Patent Number: 4,572,402
[45] Date of Patent: Feb. 25, 1986

[54] CONTAINER HAVING A HIGH DEGREE OF THERMAL INSULATION

[75] Inventors: Pierre P. Gervais, Seyssins; Bernard Simon, Le Plessis Trevise, both of France

[73] Assignee: L'Air Liquide, Societe Anonyme pour l'Etude et l'Exploitation des Procedes Georges Claude, Paris, France

[21] Appl. No.: 506,444

[22] Filed: Jun. 21, 1983

[30] Foreign Application Priority Data

Jun. 29, 1982 [FR] France ................. 82 11344

[51] Int. Cl.⁴ ............ B65D 25/02; B65D 25/18; B65D 90/08
[52] U.S. Cl. .................. 220/465; 220/420; 220/423; 220/466; 220/901
[58] Field of Search ........... 220/420, 421, 422, 423, 220/424, 425, 902, 465, 469, 466; 285/DIG. 16, 238, 332, 339, 332.2; 156/294, 293, 305

[56] References Cited

U.S. PATENT DOCUMENTS

| 2,845,199 | 7/1958 | Putman et al. ............... 220/424 |
| 3,101,862 | 8/1963 | Matsch . |
| 3,119,238 | 1/1964 | Chamberlain ............... 220/420 X |
| 3,207,354 | 9/1965 | Skinner et al. ............... 220/422 |
| 3,498,866 | 3/1970 | Kilbane ................. 285/DIG. 16 X |
| 3,937,641 | 2/1976 | Kushner ................ 285/DIG. 16 X |
| 4,120,421 | 10/1978 | Prost ........................... 220/423 |
| 4,256,333 | 3/1981 | Jones ................... 285/DIG. 16 X |
| 4,281,856 | 8/1981 | Litman et al. ........ 285/DIG. 16 X |

FOREIGN PATENT DOCUMENTS 2345658 10/1977 France .
1125588 8/1968 United Kingdom .

Primary Examiner—Allan N. Shoap
Attorney, Agent, or Firm—Lee C. Robinson, Jr.

[57] ABSTRACT

First, one end of a neck tube is adhesive bonded in an outwardly diverging frustoconical orifice of an inner vessel. The other end of the neck tube is then adhesive bonded in the outwardly converging frustoconical orifice of the upper part of the outer vessel. Thereafter the lower part of the outer vessel is welded or bonded to said upper part. The resulting container is useful for storing very high or very low temperature liquids.

8 Claims, 3 Drawing Figures

CONTAINER HAVING A HIGH DEGREE OF THERMAL INSULATION

FIELD OF THE INVENTION

The present invention relates to containers having a high degree ot thermal insulation, of the type comprising an inner vessel connected to an outer vessel by an adhesive bonded smooth-walled neck tube.

DESCRIPTION OF THE PRIOR ART

In the case of inexpensive lightweight cryogenic containers, metals such as aluminium have often been resorted to, and in order to obtain acceptable thermal performance it is essential to join the inner vessel to the outer vessel by a highly insulating neck tube which most often can only be made of plastic material. The difficulties of connecting plastic materials and aluminium for ensuring a sturdy junction are known. This has led to crimping collars defining the orifices of the inner and outer vessels into grooves provided for this purpose in the two ends of the plastic neck tube, as disclosed, for example, in British Pat. No. 1.125.588. To form such grooves, the plastic neck tube must be machined, which considerably increases the cost of such an assembly. Moreover, although such assembly methods do provide an adhesive-bonded joint having good fluidtightness, on the other hand, at the upper part, i.e. at the orifice of the outer vessel, a ring for reinforcing the upper crimp must be provided in practice, which further increases the cost.

If it is desired to simplify the assembly steps by avoiding the crimping between the collars defining the orifices of the vessels and the neck tube, thereby permitting the use of smooth-walled neck tubes without crimping grooves (see, e.g., French patent publication No. 2.345.658), there is a major drawback, for the fluidtightness at the connection of the neck tube with the inner vessel is weak, even if this weakness is compensated by an annular reinforcement at the outer vessel.

BRIEF SUMMARY OF THE INVENTION

An object of the present invention is to provide a container of the foregoing type which is not expensive and is reliable from the standpoint of mechanical strength and fluidtightness, and in particular which is highly resistant to impacts and vibrations suffered during transportation, owing to an appropriate distribution of mechanical stresses.

Accordingly, the invention provides a container of the foregoing type wherein each end of the neck tube is connected to the respective vessel by adhesive placed in an interstitial space provided between said end of the neck tube and a frustoconical collar of said vessel.

Owing to this feature, the adhesive entirely fills up the two frustoconical annular spaces formed between the assembled parts, thereby ensuring good fluidtightness. Further, by providing a small gap between each end of the neck tube and the collar to which it is joined, a high mechanical strength joint is formed and the variable radial thickness of the junction nevertheless permits very slight though sufficient deformation between the neck tube and each collar, thereby avoiding breaking stresses at the adhesive bonds and damping impacts with adhesives whose modulus of elasticity is relatively low.

According to the invention there is also provided a method for fabricating a container such as defined above and which comprises a one-piece inner vessel having an outwardly diverging frustoconical collar and a two-part outer vessel including an upper part having an outwardly converging frustoconical collar and a lower part. The method comprises three main steps. In a first step, the inner vessel is placed on its bottom, one end of the neck tube is introduced into the frustoconical collar of the inner vessel, thereby defining an interstitial space between one end of the neck tube and the frustoconical collar of the inner vessel, and said one end of the neck tube is bonded in the frustoconical collar of the inner vessel by adhesive filling the interstitial space. In a second step, the upper part of the outer vessel is placed upside down so as to bear by its frustoconical collar. The other, free end of the neck tube is introduced into the frustoconical collar of the outer vessel, thereby defining an interstitial space therebetween, and said other end of the neck tube is bonded in the frustoconical collar of the upper part of the outer vessel by adhesive filling the interstitial space. In a third step, the lower part of the outer vessel is fixed to the upper part of the outer vessel, e.g. by bonding or welding.

BRIEF DESCRIPTION OF THE DRAWINGS

These and other features and advantages of the invention will be brought out in the description which follows with reference to the drawings.

DESCRIPTION OF THE PREFERRED MODE OF FABRICATION

Figure 1:
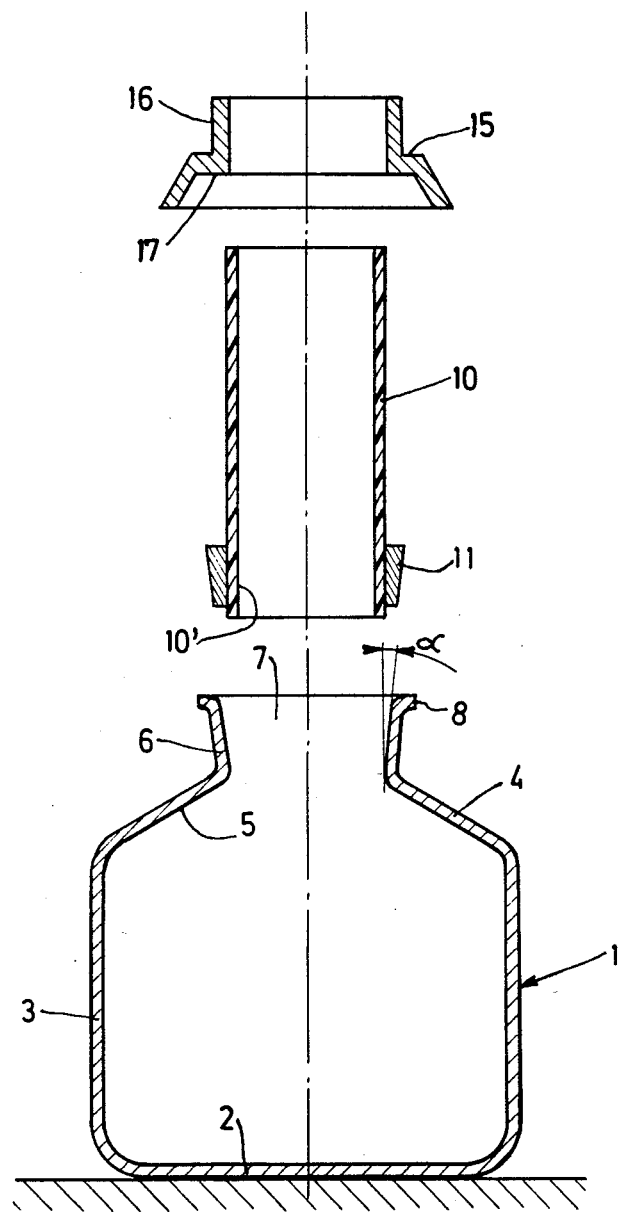
FIGS. 1–3 are diagrammatic vertical sectional views of the three main steps in the fabrication of a container having a high degree of insulation, according to the invention.

Referring to the accompanying drawings, a one-piece inner vessel 1 is prepared comprising a bottom wall 2, a cylindrical sidewall 3 and a top wall 4 including a first outwardly converging frustoconical portion 5 followed by a second outwardly diverging frustoconical portion 6 defining a collar or orifice 7 and terminating by an outwardly flared flange 8.

Figure 2:
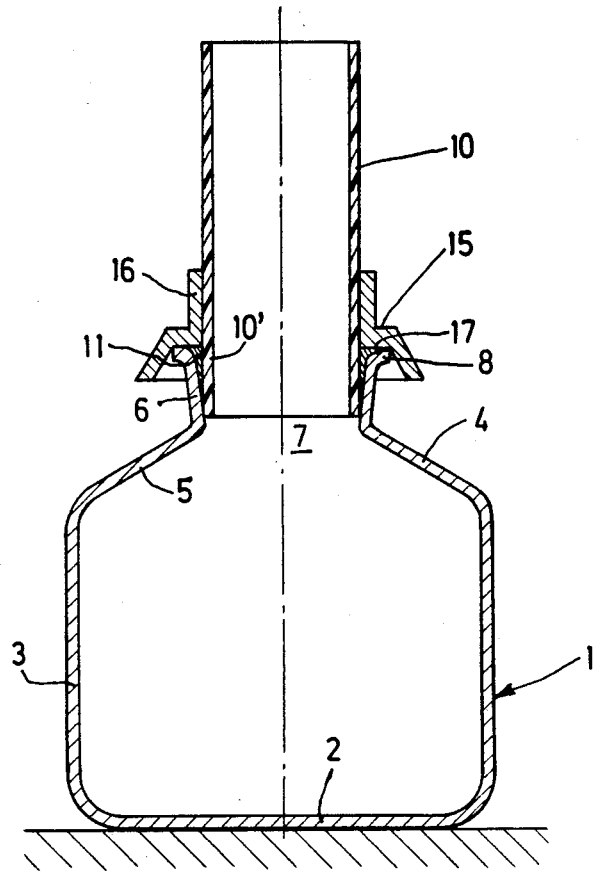

A neck tube is prepared comprising a lenght of smooth-walled tube of epoxy glass 10 which is coated at its lower part with a bead 11 of adhesive. In conformity with FIG. 2, the lower part 10' of the neck tube 10 is engaged in the orifice 7 of the inner vessel 1. The size of the parts is selected so that the adhesive bead completely fills the interstitial cavity between the orifice 7 and the lower part 10' of the neck tube 10. The ultimate configuration may be ensured by a pressure fixture 15 having a hub 16 slidable along the outside of the neck tube 10 and a bearing shoulder 17 adapted to distribute and compress the adhesive in the interstitial cavity, whereupon the adhesive is made to cure and to harden.

Figure 3:
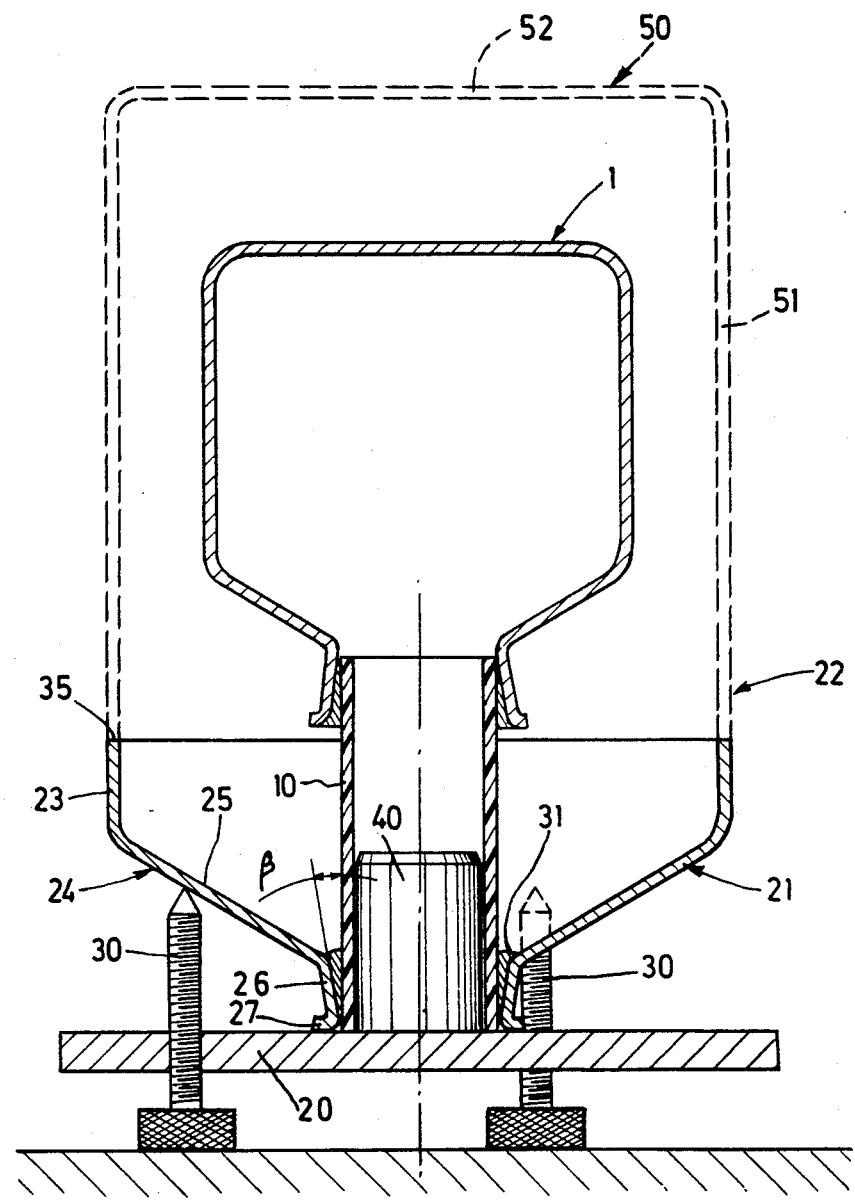

Once this step is finished, a sheet metal stamping 21 adapted to form the upper part of an outer vessel 22 is placed on a table 20 (FIG. 3). To this end, the stamping 21 has a cylindrical portion 23 and a top portion 24 including an outwardly converging frustoconical portion 25 followed by a collar or orifice 26 which is also a frustoconical portion converging outwardly of the orifice, but at a smaller angle of convergence, and terminates by outwardly flared flange 27. The stamping 21 bears on the table 20 by the flange 27 of the orifice 26, i.e. with the upper end of the outer vessel facing down. The stamping 21 is held in the correct position by three props 30 of adjustable height. Once the position of the stamping 21 has been determined, the inner vessel 1 with the neck tube 10 coated with a bead 31 of adhesive at its free end is brought to its final position relative to the upper part 21 of the outer vessel, that is to say, the assembly of the inner vessel 1 and the neck tube 10 is turned upside down in order to engage the neck tube 10 into the orifice 26 of stamping 21, the correct position being determined by a mandrel 40 integral with table 20.

In this position, as in that described previously, the bead 31 of adhesive is then cured and hardened, for example by polymerization, which ensures the formation of an intermediate assembly held together by adhesive bonding such as shown in solid lines in FIG. 3. Thereafter, a complementary part 50 of the outer vessel may be adhesive bonded or welded along the upper edge 35 of the sidewall 23, the complementary part 50 comprising a cylindrical sidewall 51 and an endwall 52. Of course, beforehand, if necessary, around the inner vessel and around the neck tube may be placed multiple layers of insulating and reflecting materials (not illustrated) adapted to provide, if necessary with a vacuum subsequently established in the enclosed space between the inner and outer vessels, very high quality thermal insulation.

Once the container has thus been completed, the mandrel 40 is withdrawn.

Preferably, the divergent frustoconical angle $\alpha$ between the neck tube and the outwardly diverging frustoconical portion 6 of the orifice 7 of the inner vessel 1 is between 3° and 15°, and preferably between 3° and 10° for normal axial bonding heights (angle $\alpha$ may be between 10° and 15° for relative short axial bonding heights). Likewise, the outwardly converging frustoconical angle $\beta$ between the neck tube 10 and the outwardly converging frustoconical portion of the orifice 26 of the outer vessel 22 is in an angular range such as that specified above for angle $\alpha$. The axial height along the axis of the orifices, i.e. along the axis of the neck tube, of the outwardly diverging frustoconical portion 6 and the outwardly converging frustoconical portion 26 is between 10 and 30 mm, and the axial length at the level of the end flanges 8 and 27 of the orifices is between 2 and 6 mm. The minimal radial gap between the neck tube 10 and the orifice 6 or 26 is between 0 and 0.5 mm.

The invention is applicable to all containers adapted to be provided with a high degree of thermal insulation, whether for very low temperatures or very high temperatures relative to ambient temperature.

The adhesive bonding procedure described above may apply to aluminum or stainless steel vessels, whereas the neck tube connecting the vessels may be made of resin, in particular an epoxy resin, stainless steel or other materials having low thermal conductivity (plastic materials whether or not reinforced).

Alternatively, the direction of convergence of the orifice 6 and/or the orifice 26 may be reversed. The mechanical and fluidtight properties of the two adhesive bonded joints are preserved, but of course the method of fabrication of the container must be adapted to each configuration, as will be understood by those skilled in the art. In particular, the outward convergence of the orifice of the inner vessel will in practice be reserved for two-part inner vessels for obvious reasons of ease of adhesive bonding.

What is claimed is:

1. A container having a high degree of thermal insulation, comprising a preformed inner vessel having a frustoconical collar with an angle of convergence in the range 3° to 15°, a preformed, two-part outer vessel having a frustoconical collar with an angle of convergence in the range 3° to 15°, and a smooth-walled precut neck tube connecting said inner and outer vessels together, end portions of said tube being received in said frustoconical collars of the respective vessels with an interstitial space defining a minimum radial gap up to 0.5 mm between each neck tube end portion and the respective frustoconical collar, and adhesive material received in the interstitial spaces for bonding the neck tube end portions in said frustoconical collars and defining respective bonded joints, the collars of the inner and outer vessels being frustoconical for substantially the extent of said bonded joints and the lengths of the collars, and each frustoconical collar at the beginning of its angle of convergence extending directly from a wall of the vessel to which it is associated, each wall defining a major enclosing surface of each respective vessel, said adhesive material in said interstitial spaces forming a continuous bond up to 0.5 mm thickness over a significant length of the neck tube end portion, wherein the axial length of the collars measured from the minimum radial gap between the tube neck ends and their respective frustoconical collars is between 10 and 30 min.

2. A container as defined in claim 1, wherein said inner vessel is of one-piece construction, said frustoconical collar of said inner vessel diverging outwardly therefrom.

3. A container as defined in claim 1 or 2, wherein said frustoconical collar of said outer vessel converges outwardly therefrom.

4. A container as defined in claim 1, wherein said neck tube is made of a low thermal conductivity material.

5. A container as defined in claim 4, wherein said neck tube is made of epoxy glass resin and each said vessel is metal.

6. A container as defined in claim 4, wherein said neck tube is made of stainless steel and each said vessel is metallic.

7. A container as defined in claim 1, wherein each said vessel is made of a metal selected from the group consisting of aluminum and stainless steel and said neck tube is made of a synthetic resin.

8. A container as defined in claim 1, wherein said neck tube is made of a stainless steel having low thermal conductivity, and wherein each said vessel is made of aluminum.

* * * * *